Patented Jan. 3, 1939

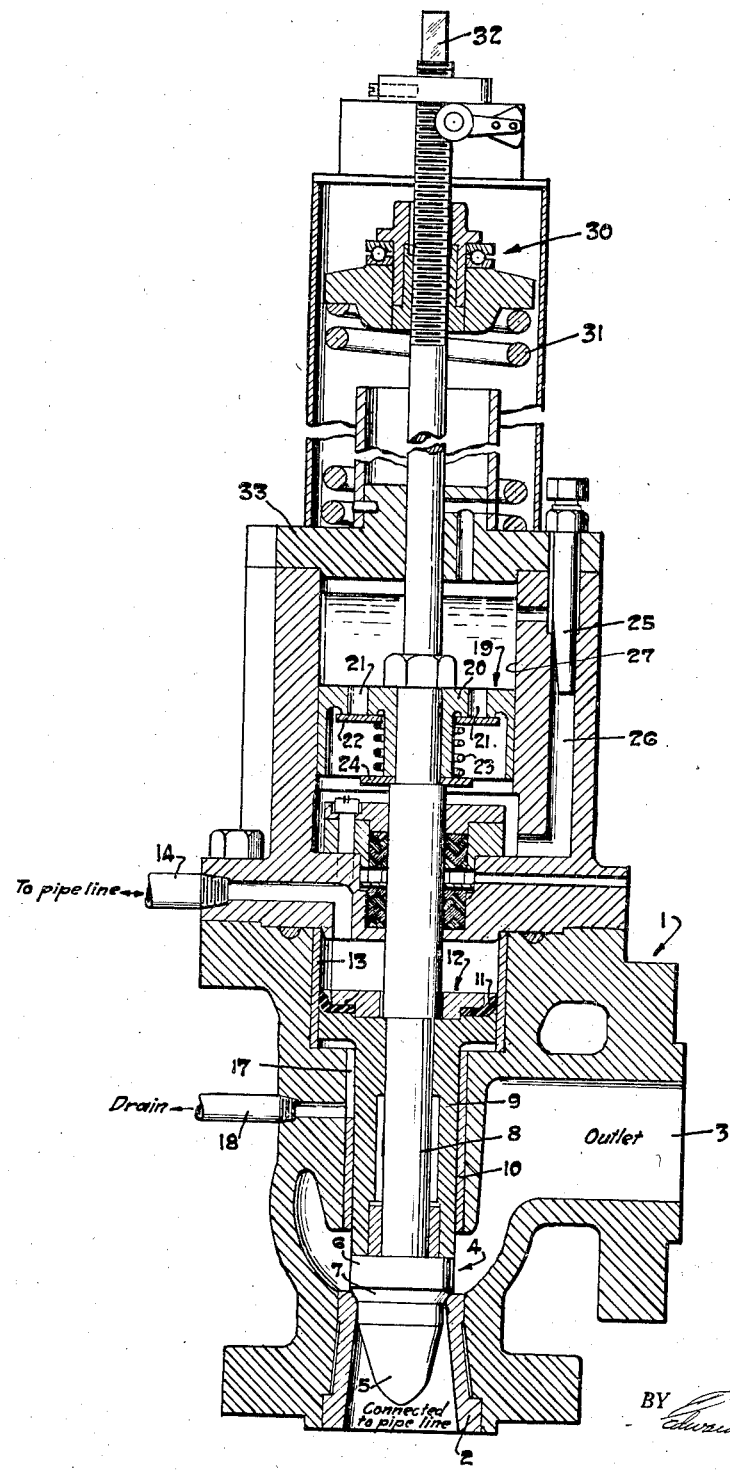

2,142,410

UNITED STATES PATENT OFFICE 2,142,410

SURGE SUPPRESSOR

Ray S. Quick, Burlingame, Calif., assignor to The Pelton Water Wheel Company, a corporation of California Application February 21, 1935, Serial No. 7,522
In Canada November 9, 1934

1 Claim. (Cl. 137—153)

This invention relates generally to surge suppressing apparatus and more particularly to an improved surge suppressor valve adapted to control pressure surges of relatively high frequency. In hydraulic pipe lines, especially water distribution lines and pumping systems such as are used in water works systems of cities and towns, situations may arise that will cause a drop in pressure below normal which is usually termed a down surge, followed by a rise in pressure above normal which rise is generally termed a return surge. The down surge and return surge are in the nature of pressure waves oscillating back and forth through the pipe line when the flow therethrough is comparatively quickly discontinued or stopped. This discontinuance may be caused by either a normal or emergency shutting down of a pump, or by the rapid closure of a check valve or other type of valve in the pipe line in order to prevent any substantial reverse flow through the pipe line when the pump stops or when the valves are otherwise operated in such a manner in controlling flow through the pipe line that pressure surges are created therein. The rate with which the initial down surge may occur and the frequency of the subsequent return surges and down surges will vary in accordance with the rapidity with which the pump is stopped or the check valve closed and principally the length of the pipe line.

It is one object of my invention to provide an improved apparatus for suppressing surges and especially surges of relatively high frequency. In one aspect of the invention I control pressure surges having high frequency characteristics by providing a valve which is so constructed and arranged that it will open very rapidly on an initial down surge, thereby being already open when the relatively rapid return surge occurs, thus providing a free discharge outlet for the same. More specifically I preferably accomplish rapid opening of the valve by the use of mechanical means exerting a constant force on the valve at all times in an opening direction and then control the release of this opening force. In one specific aspect of the invention this mechanical means is in the form of a spring which imposes a constant opening force on the valve, while the means for controlling the release of such force is a hydraulic piston and cylinder connected to the pipe line in such a manner that the hydraulic pressure is released during the down surge, thereby permitting the spring to almost instantaneously open the suppressor valve during the initial down surge.

Another object has to do with providing improved means for effectively controlling the reclosure of the suppressor valve during the return surge or subsequent surges until the valve is finally closed when the pipe line pressure has been restored to substantially normal pressure. Other objects have to do with providing an improved arrangement and combination of elements whereby the suppressor valve may be of the elbow type, and with providing an improved combination whereby the various parts are substantially readily accessible for inspection, adjustment or repair and are so arranged and constructed that they may be relatively economically manufactured without impairing the efficient operation of the valve particularly when the valve is used for controlling high frequency pressure surges.

Other objects and advantages will be more apparent to those skilled in the art from the following description of the accompanying drawing which is a vertical sectional view of one specific form of my improved surge suppressor.

In the particular embodiment of the invention which is shown herein merely for the purpose of illustrating one specific form among possible others that the invention might take in practice, I have provided an elbow type valve generally indicated at 1. A removable member 2 preferably forms a tapered passageway communicating with an outlet 3, the passage 2 being connected to a pipe line to provide a free discharge outlet therefor to suppress surges. A plunger 4 has preferably a conical portion 5 and a cylindrical portion 6 connected together by a tapered seating portion 7. This plunger is secured to the end of a valve stem 8 while a combined plunger and guide sleeve 9 is also secured on said stem between a shoulder thereon and valve plug 4. This sleeve, stem and plug are adapted to be guided in any suitable bearing 10 projecting into the elbow passageway which extends from the member 2 to the outlet 3. A suitable packing 11 is provided on member 9 to form a servo-motor piston generally indicated at 12. Piston 12 operates in a cylinder 13, the upper end of which is supplied with pipe line fluid through a pipe connection 14. This connection or passage is connected to the pipe line preferably on the downstream side of a check valve, or of a stop valve in case such is to be used for controlling fluid flow through the pipe line. In general it might be said that pipe 14 is connected to the pipe line so as to reflect the surge conditions which it is desired to have the valve control. The lower end of cylinder 13 is vented along a grooved passageway on the outer surface of bearing 9 as indicated at 17, this vent passage communicating with any suitable drain outlet 18.

A dashpot generally indicated at 19 includes any suitable piston 20 having ports 21 normally closed by an annular valve 22 yieldably held in closed position by a spring 23. This spring is interposed between the valve and a suitable collar 24 engaging a shoulder on the valve stem 8. An adjustable bypass valve 25 allows restricted flow of liquid through a passage 26 from the lower end of dashpot cylinder 27 to the upper end thereof during the closing or down stroke of the suppressor valve and dashpot cylinder, it being understood that the suppressor valve and dashpot may easily move upwardly due to the flow of liquid from the upper end of the dashpot cylinder past valve 22 to the lower end of the cylinder.

The valve stem 8 projects upwardly through dashpot piston 20 and carries at its upper end an axially adjustable nut and thrust collar generally indicated at 30, the nut having threaded engagement with the upper end of the valve stem. A coiled spring 31 is interposed between said collar and the upper cylinder head 33 of the dashpot. The upper end of the valve stem is provided with any suitably flatted or squared portion 32 to permit rotation of the valve stem, thereby to effect axial adjustment of the thrust collar along the same. As a result, the compression of spring 31 may be conveniently varied or adjusted to effect an initial opening force on the valve in accordance with the rate at which it is desired to open the same. The rate of opening will be determined by the frequency characteristics of the pressure surges which will vary greatly with various pipe line factors as previously mentioned.

*Operation.*—Assuming that the suppressor valve is being used in a system employing a pump and check valve, or stop valve, then when the pump stops and a down surge occurs, the pressure near the pump end of the line drops below normal. This is followed by a subsequent return surge, the pressure near the pump now building up above normal. During the initial down surge the consequent drop in pressure permits pressure in cylinder 13 to fall whereupon spring 31 immediately moves valve 4 upwardly to open the elbow passageway to outlet 3. This opening operation takes place before the return surge occurs, and hence the pipe line liquid may discharge freely through the outlet during the pressure rise, thus relieving the pipe line of an excessive pressure rise which is apt to cause damage to or leakage in the pipe line due to spreading of joints, etc. Opening movement of the valve is not retarded by dashpot 19. However, during the return surge the pressure rise is transmitted to cylinder 13 to cause reclosure of the suppressor valve, this reclosure being relatively gradual due to closure of dashpot valve 22 on the down stroke and thus causing dashpot liquid to gradually flow through bypass 26 and past adjustable bypass valve 25 to the upper side of the dashpot piston until finally the valve is fully closed.

It is seen from the foregoing disclosure that I have provided an improved valve adapted to efficiently function to control pressure surges especially of high frequency, although it is equally applicable to pressure surges of lower frequencies. It is also seen that my improved arrangement effectively permits the use of an elbow type suppressor valve and that the rates of opening and closing of the valve may be independently controlled by adjustment of the bypass valve 25 and the thrust collar 30.

It will of course be understood that various changes in details of construction and arrangement of parts may be made by those skilled in the art without departing from the spirit of the invention as set forth in the appended claim.

I claim:

A surge suppressor adapted to be connected to a pipe line to control pressure surges therein comprising, in combination, means providing an orifice communicable with the atmosphere when open thereby to freely discharge liquid from the pipe line to the atmosphere, a valve for controlling said orifice, a piston and cylinder, means for supplying pressure from the pipe line to said cylinder to hold said valve closed during existence of normal pipe line pressure, a spring urging said valve toward an open position, whereby upon an initial down surge in pipe line pressure below normal said valve is opened to allow free discharge of fluid from the pipe line upon a return pressure surge, and a dashpot to permit relatively fast opening of said valve by said spring but gradual reclosure of the valve during the return pressure surge.

RAY S. QUICK.